March 31, 1942.   H. A. DELANO   2,277,848
METHOD OF AND APPARATUS FOR WELDING
Filed Dec. 2, 1939
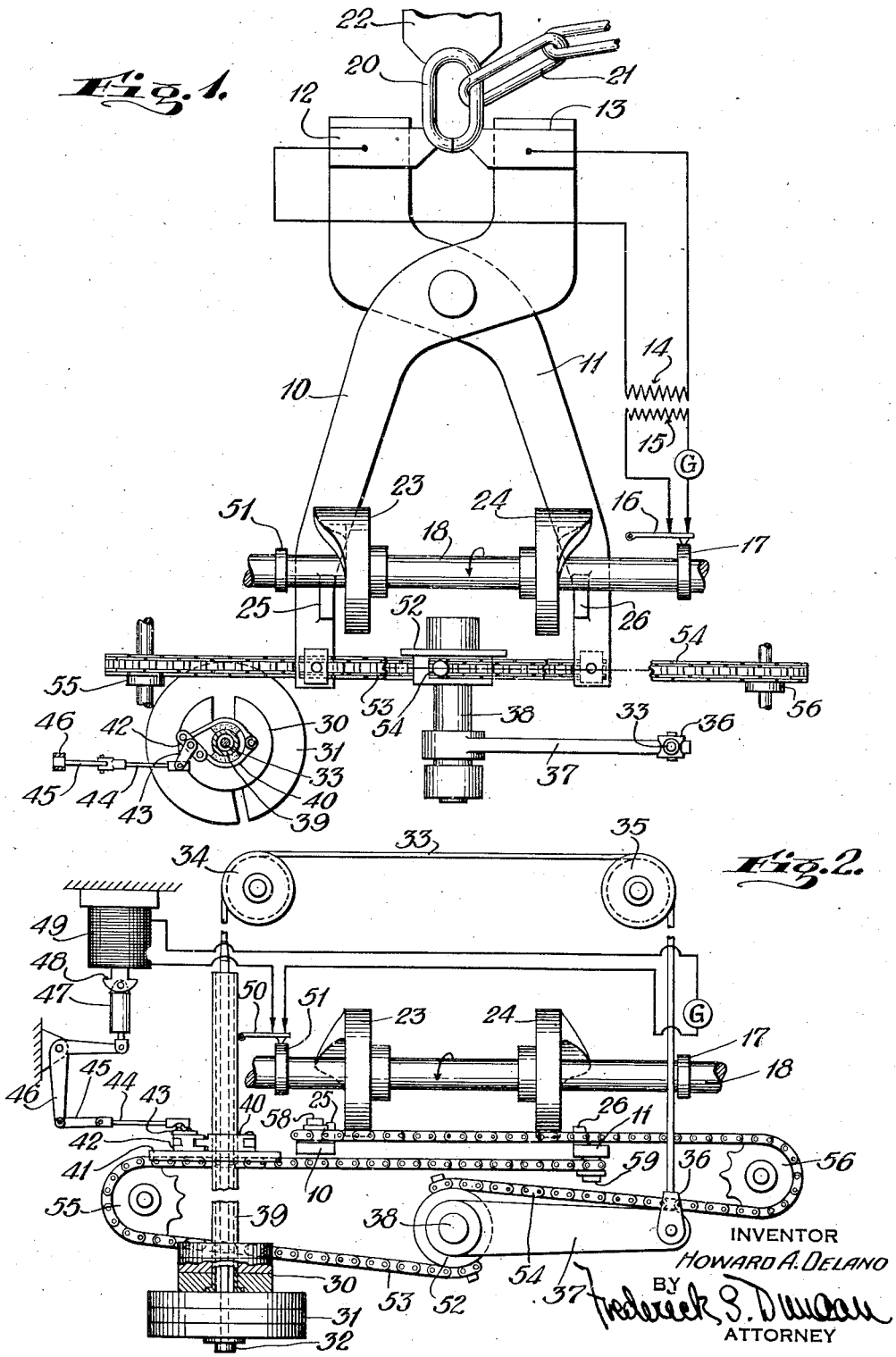
INVENTOR
HOWARD A. DELANO
BY
Frederick S. Duncan
ATTORNEY Patented Mar. 31, 1942

2,277,848

UNITED STATES PATENT OFFICE 2,277,848

METHOD OF AND APPARATUS FOR WELDING

Howard A. Delano, Springettsbury Township, York County, Pa., assignor to American Chain & Cable Company, Inc., New York, N. Y., a corporation of New York Application December 2, 1939, Serial No. 307,270

8 Claims. (Cl. 219—4)

This invention relates to a method of welding and to apparatus by which the method may be carried out.

Spring operated welders are satisfactory on low carbon material and on some high carbon material where the welding range is quite wide. On alloys the spring is not accurate enough. Hydraulic means developed to take the place of the spring works satisfactorily on large sizes. On small sizes hydraulic movements are too slow to produce the chain rapidly. Cam operated welders are hard to adjust to provide the proper amount of initial and final shoves during the welding operation.

Among objects of my invention are the provision of a welding apparatus requiring less actual adjustments, the use of welding jaw actuating means which operates to produce a perfect weld within quite wide ranges of welding temperatures thus eliminating micro adjustments on photoelectric cells, radiation pyrometers, and so forth, the use more particularly of weights as welding jaw actuating means and the combined and divisional use of said weights, using the combined weights to close the gap in link, using one of the weights to maintain light contact between the ends of the link to increase the resistance to the welding current and to upset the ends of the link during the heating period, using the other weight to complete the upsetting operation by a hammer blow operation on the first weight, and using the combined weights during the cooling period, the construction being preferably such that the pressure of the weights on the welding jaws decreases during the softening operation.

Other objects of the invention will appear from the following description taken in connection with the drawing in which, Fig. 1 is a top plan view of parts of the welding machine, showing the parts in the position they occupy at the time the welding current is turned on; and Fig. 2 is a rear elevational view looking toward the bottom of Fig. 1.

In accordance with the method of my invention pressure sufficient to close the gap in a link is applied to the welding jaws and after the gap has been closed less pressure on the welding jaws holds the ends of the link together at the time the welding current is passed across the ends of the link which on account of the high resistance set up due to the light pressure between the ends, raises the temperature of the ends of the link to welding temperature in a very short time. This light pressure is continued to initially upset the link, forcing some of the plastic material out of the joint, the welding current is then interrupted and the welding jaws are forced together by a hammer blow impact to complete the weld, and then the jaws are pressed together during the cooling period by the pressure forces used in closing the link but under reduced leverage conditions.

In the drawing I have disclosed an apparatus for carrying out the method, but I have deemed it sufficient to illustrate only those parts of the apparatus which are directly concerned with the improvements. The various elements disclosed are mounted on brackets on a frame which it has not been deemed necessary to illustrate.

The apparatus disclosed includes a pair of welding jaws 10 and 11 pivoted together in scissors fashion and equipped with welding electrodes 12 and 13 connected in a circuit including the secondary coil 14 of a transformer, the primary coil 15 of which is connected in a circuit including a generator G, the circuit being opened and closed by means of a contact member 16 operated by a cam 17 on the main operating shaft 18. The welding jaws 10 and 11 may be separated to receive a split link 20, the ends of which are spaced apart so that they may be assembled with the welded links of the chain 21. The closed end of the link rests against a welding stop 22 and when the jaws are moved together the gap in the link will be closed as is understood.

Mounted on the main operating shaft 18 are cams 23 and 24 which operate on lugs 25 and 26 on the operating arms of the welding jaws 10 and 11 to open the jaws to receive the links. The cams are provided with gradually sloping curved faces to open the jaws and with steeper curved faces to permit the jaws to be closed. When the machine is at rest or at the end of the welding cycle the jaws are held apart by the high portions of the cams.

The means for applying pressure to the jaws to close the same comprises an upper weight 30 and a lower weight 31 each of which may comprise a plurality of radially slotted discs such as are used on scales. The weight 31 rests on a washer resting on the shouldered end 32 of a sleeve swaged on the end of a cable 33 which passes over a pulley 34 and pulley 35 and has its socket 36 pivotally connected to an arm 37 secured on a shaft 38 suitably journaled in the frame of the machine. The weight 30 is supported on a flange on the lower end of a tube 39 through which the sleeve on the cable 30 passes. The construction is such that the weight 31 may be permitted to separate from the weight 30 and for this purpose I have provided a clamp which may be in the form of a contractible brake band 40 which may rest on a plate 41 on the frame of the machine. This band comprises two pivoted parts pivoted on said plate and each of which may be provided with a brake lining, the ends of the parts being connected together by a link 42 to which is connected an arm 43 operated by a rod 44, all of this brake construction being old and well known. The rod 44 is operated by a link 45 pivotally connected to a bell crank 46 the upper end of which is connected by a link 47 to the core 48 of the solenoid 49, the circuit across which may be opened and closed by a contact member 50 operated by a cam 51 on the main operating shaft 18.

Mounted on the shaft 38 on which the arm 37 is mounted is a drum 52 to which the ends of sprocket chains 53 and 54 are connected by any suitable means as indicated. These chains extend respectively toward the left and right and upwardly over sprocket wheels 55 and 56 and then extend toward and past each other to the operating arms of the welding jaws to which they are connected by any suitable means such as studs 58 and 59.

In the drawing I have shown the parts in the position they occupy at the time the gap in the link has been closed and the welding current turned on and the brake applied to the upper weight 30. Shortly after the beginning of an operation the rotation of the shaft 18 and cams 23 and 24 permits the jaws 10 and 11 to approach each other under the influence of the combined weights 30 and 31. After a predetermined amount of angular rotation of the shaft 18 and at the time when the gap in the link has been closed, the cam 17 closes the contact member 16 and applies welding current across the electrodes 12 and 13 and the ends of the link, and at the same time the cam 51 closes the contact member 50 and applies current across the solenoid 49 which operates the brake band 40 to clamp the tube 39 to support the upper weight 30. As the metal at the abutting ends of the link softens, the lower weight 31 forces the ends of the link toward each other forcing out material which is not suitable for welding and after a predetermined amount of movement of the ends of the link as determined by the cams 17 and 51 etc., the welding current is interrupted and the upper weight 30 is permitted to drop against the lower weight 31 and deliver a hammer blow to the jaws 10 and 11, effecting the final upsetting in the welding process. Both of the weights 30 and 31 operate on the ends of the link during the cooling period to prevent disrupting of the weld.

As appears from Fig. 2 the arm 37 is substantially in a horizontal position at the time the welding current is turned on and the parts are designed so that the arm 37 will assume an angle of 30° to 40° with the horizontal at the end of the welding operation. The purpose of this is to cause the welding jaws to be pressed together under decreasing pressure as the link is softened during the initial stage of the welding operation.

While I have described the method and one form of apparatus for carrying out this method, it is to be understood that I reserve the right to all such changes as fall within the principles of my invention and the scope of the appended claims.

I claim:

1. The method of electrically butt welding which consists in passing a welding current through ends to be butt welded, pressing said ends together with a decreasing follow-up pressure to upset said ends during the application of the welding current, interrupting said current and completing the upsetting operation by applying a hammer blow on said ends while said follow-up pressure is continued, and continuing said decreasing follow-up pressure and applying an additional decreasing pressure during the cooling period.

2. The method of electrically butt welding which consists in passing a welding current through ends to be butt welded and applying a weight to upset said ends during the application of the welding current, dropping a weight to complete the upsetting operation by a hammer blow impact while said first mentioned weight continues to operate on said ends, and continuing the application of said first mentioned weight and said latter weight during the cooling period.

3. The method of electrically welding a split link having an open gap which consists in employing two weights to close said gap, passing a welding current across the contacting ends of said link and restraining movement of one of said weights, discontinuing the passage of said current and releasing said restrained weight to further upset said ends by impact of said latter weight against the other of said weights, and employing both of said weights on said weld during the cooling period.

4. In an electric welding apparatus, the combination of pressure devices for pressing the ends of a split link into contact and for upsetting the ends, a plurality of weights for operating said pressure devices, means for utilizing the force exerted by both weights for pressing the ends of the link in the contact, means for applying a welding current across the abutting ends, means for utilizing one of the weights to upset said ends during the application of the welding current, means for interrupting the welding current, and means for utilizing said latter weight and the kinetic energy resulting from a free drop of the other weight to upset said ends after the current has been interrupted to complete the upsetting operation and for utilizing both weights during the cooling period.

5. In an electric welding apparatus, the combination of pressure devices for pressing the ends of a split link into contact and for upsetting the ends, a plurality of weights for operating said pressure devices, means utilizing the descent of both weights to move the ends of the link into contact, means for applying a welding current across the abutted ends, means arresting the descent of one weight and utilizing the other weight to upset the ends during the heating period, means for releasing said first weight and utilizing its kinetic energy developed by a free drop at the termination of the heating period to complete the upsetting operation, and means for utilizing both weights to exert pressure on the weld during the cooling period.

6. In a welding apparatus, the combination of a pair of welding jaws, a main operating shaft, means operated by said shaft for opening said jaws to receive a split link, weights adapted to close said jaws to close the link and to upset the same during the welding operation, means operated by the shaft for applying a welding current across the ends of the link, means also operated by the shaft for arresting one of said weights while the other weight is free to descend, and means for interrupting the welding current and releasing the first mentioned weight.

7. In a welding apparatus, the combination of a pair of welding jaws, means for pressing said jaws together comprising superimposed weights, means connecting the lower of said weights to said welding jaws, the upper of said weights being supported on said lower weight, means for applying a welding current across the gap of the link pressed between said jaws and for interrupting said current, means for restraining movement of the upper weight as the welding current is applied, and means for releasing the upper weight as the welding current is interrupted.

8. In a welding apparatus, the combination of a pair of welding jaws, a pair of weights for operating said jaws, connections between said weights and jaws, means for applying the forces exerted by both weights on said jaws to close the jaws to bring the ends of the split link into contact, means for restraining one of said weights against further descent after said jaws have been moved to bring the ends of the link into contact, means for applying a welding current across the ends of said link, means for releasing said one weight after the welding current has softened the ends of said link and after said jaws have moved to upset the ends of said link and for simultaneously interrupting the welding current, and means for continuing forces exerted by both weights on said jaws during the cooling period.

HOWARD A. DELANO.